United States Patent
Serena et al.

(10) Patent No.: US 12,425,104 B2
(45) Date of Patent: Sep. 23, 2025

(54) RECEIVER-BASED FIBER-OPTIC LINK MONITOR

(71) Applicant: Nokia Solutions and Networks Oy, Espoo (FI)

(72) Inventors: Paolo Serena, Podenzano (IT); Chiara Lasagni, Quattro Castella (IT); Alberto Bononi, Lesignano de' Bagni (IT); Matteo Lonardi, Villafranca di Verona (IT); Petros Ramantanis, Antony (FR); Amirhossein Ghazisaeidi, L'Hays-les-Roses (FR)

(73) Assignee: Nokia Solutions and Networks Oy, Espoo (FI)

( * ) Notice: Subject to any disclaimer, the term of this patent is extended or adjusted under 35 U.S.C. 154(b) by 274 days.

(21) Appl. No.: 18/341,427

(22) Filed: Jun. 26, 2023

(65) Prior Publication Data
US 2024/0007187 A1    Jan. 4, 2024

(30) Foreign Application Priority Data

Jul. 1, 2022   (EP) ..................... 22315133

(51) Int. Cl.
*H04B 10/61* (2013.01)
*G01M 11/00* (2006.01)
(Continued)

(52) U.S. Cl.
CPC ....... *H04B 10/2513* (2013.01); *G01M 11/337* (2013.01); *G01M 11/338* (2013.01); *H04B 10/07951* (2013.01); *H04B 10/61* (2013.01)

(58) Field of Classification Search
CPC .................. H04B 10/079–0799; H04B 10/616
See application file for complete search history.

(56) References Cited

U.S. PATENT DOCUMENTS 7,558,479 B1 * 7/2009 Robinson ........... H04B 10/2543
  398/16
8,594,499 B1 * 11/2013 Roberts ................ H04B 10/073
  398/28
(Continued)

FOREIGN PATENT DOCUMENTS

EP          20240007187 A1    1/2024

OTHER PUBLICATIONS

F. Azendorf, A. Dochhan and M. H. Eiselt, "Accurate Single-Ended Measurement of Propagation Delay in Fiber Using Correlation Optical Time Domain Reflectometry," in Journal of Lightwave Technology, vol. 39, No. 18, pp. 5744-5752, Sep. 15, 2021, doi: 10.1109/JLT.2021.3094247. (Year: 2021).*

(Continued)

*Primary Examiner* — Nathan M Cors
(74) *Attorney, Agent, or Firm* — Stratford Group Ltd.

(57) ABSTRACT

A digital processor (DP) is configured to obtain a temporal sequence of digital phase distortion measurements of a first optical signal received by a coherent optical receiver (COR) from an optical fiber link, where the first optical signal co-propagates with a second, power-modulated, optical signal in different frequency channels. The DP is configured to estimate a cross-correlation between the temporal sequence of digital measurements and a temporal sequence of powers of the second optical signal for a plurality of relative time shifts between the sequences, and to identify a location along the optical fiber link based on a magnitude of the cross-correlation exceeding a threshold for a particular time shift.

16 Claims, 9 Drawing Sheets

(51) Int. Cl.
　　　*H04B 10/079*　　　(2013.01)
　　　*H04B 10/2513*　　(2013.01)

(56) References Cited

U.S. PATENT DOCUMENTS

| | | | |
|---|---|---|---|
| 10,419,117 | B2 | 9/2019 | Tanimura et al. |
| 2018/0316422 | A1* | 11/2018 | Kato .................. G01M 11/3181 |
| 2024/0072891 | A1* | 2/2024 | Bjørnstad .......... H04B 10/0791 |

OTHER PUBLICATIONS

Tanimura, S. Yoshida, K. Tajima, S. Oda and T. Hoshida, "Fiber-Longitudinal Anomaly Position Identification Over Multi-Span Transmission Link Out of Receiver-end Signals," in Journal of Lightwave Technology, vol. 38, No. 9, pp. 2726-2733, 1 May 1, 2020, doi: 10.1109/JLT.2020.2984270. (Year: 2020).*

Office Action issued Dec. 6, 2024 for corresponding EP application No. 22315133.3.

Pointurier, "Design of low-margin optical networks", Journal of Optical Communications and Networking, vol. 9, No. 1, Jan. 2017, pp. A9-A17.

Delezoide et al., "Leveraging Field Data For The Joint Optimization of Capacity and Availability in Low-Margin Optical Networks", Journal of Lightwave Technology, vol. 38, No. 24, Dec. 15, 2020, pp. 6709-6718.

Hauske et al., "Optical performance monitoring in digital coherent receivers", Journal of Lightwave Technology, vol. 27, No. 16, Aug. 2009, pp. 3623-3631.

Sasai et al., "Simultaneous detection of anomaly points and fiber types in multi-span transmission links only by receiver-side digital signal processing", Optical Fiber Communications Conference and Exhibition (OFC), Mar. 8-12, 2020, 3 pages.

Sasai et al., "Digital Longitudinal Monitoring of Optical Fiber Communication Link", Journal of Lightwave Technology, vol. 40, No. 8, Apr. 15, 2022, pp. 2390-2408.

Tanimura et al., "Semi-blind nonlinear equalization in coherent multi-span transmission system with inhomogeneous span parameters", Conference on Optical Fiber Communication (OFC/NFOEC), collocated National Fiber Optic Engineers Conference, Mar. 21-25, 2010, 3 pages.

Tanimura et al., "Fiber-Longitudinal Anomaly Position Identification over Multi-Span Transmission Link out of Receiver-end Signals", Journal of Lightwave Technology, vol. 38, No. 9, May 1, 2020, pp. 2726-2733.

Tanimura et al., "Concept and implementation study of advanced DSP-based fiber-longitudinal optical power profile monitoring toward optical network tomography [Invited]", Journal of Optical Communications and Networking, vol. 13, No. 10, Oct. 2021, pp. E132-E141.

Dar et al., "Pulse Collision Picture of Inter-Channel Nonlinear Interference in Fiber-Optic Communications", Journal of Lightwave Technology, vol. 34, No. 2, Jan. 15, 2016, pp. 593-607.

Essiambre et al., "Capacity Limits of Optical Fiber Networks", Journal of Lightwave Technology, vol. 28, No. 4, Feb. 2010, pp. 662-701.

Ramantanis et al., "Revisiting the calculation of performance margins in monitoring-enabled optical networks", Journal of Optical Communications and Networking, vol. 11, No. 10, Oct. 2019, pp. C67-C75.

Extended European Search Report received for corresponding European Patent Application No. 22315133.3, dated Jan. 24, 2023, 5 pages.

EP Application 22 315 133.3—Communication Under Rule 71(3)—issued Jul. 10, 2024.

Ian Redpath, [OVUM19] Ovum, Optical Networks Forecast Report: 2018-2023, OMDIA, Publication date: Jan. 16, 2019, 24 pages.

* cited by examiner

RECEIVER-BASED FIBER-OPTIC LINK MONITOR

This application claims priority to European Patent Application No. 22315133.3, titled "RECEIVER-BASED FIBER-OPTIC LINK MONITOR", by Paolo Serena et al and filed Jul. 1, 2022.

TECHNICAL FIELD

The present disclosure generally relates to optical systems, and more particularly relates to monitoring of coherent fiber-optic communication links.

BACKGROUND

Modern broad-band optical communications networks, in particular those using coherent transmission and detection of optical signal, may include fiber-optic links spanning hundreds of kilometers without optical signal regeneration. Such optical communication networks typically transmit multiple wavelength-multiplexed channels over a same optical fiber and use digital signal processing at the receiver to extract transmitted signals. Performance of such long fiber-optic links may however vary over time, e.g., due to component aging, environmental effects, external interference, etc., which may occur at different locations along the link. Therefore, link monitoring techniques capable of detecting changes in relevant link parameters and estimate approximate locations of the changes along a fiber-optic link are of interest.

SUMMARY

An aspect of the present disclosure relates to an apparatus comprising: a digital processor (DP) being configured to receive a temporal sequence of digital measurements of a first optical signal received by a coherent optical receiver (COR) from an optical fiber link and being configured to estimate a cross-correlation between the temporal sequence of digital measurements and a temporal sequence of powers of a power-modulated second optical signal for a plurality of relative time shifts between the sequences, the second and first and second optical signals having been transmitted to the optical fiber link in different frequency channels, each of the digital measurements representing a phase of the received first optical signal at a corresponding time. The DP is configured to identify a location along the optical fiber link as having a physical change in response to a magnitude of a difference between the estimated cross correlation and reference cross-correlation being greater than a fixed value for one of the relative time shifts, and to estimate the location of the physical change from the value of the one of the relative time shifts.

A related aspect of the present disclosure provides a method for monitoring an optical fiber link. The method comprises: at a digital processor (DP), receiving a temporal sequence of digital measurements of a first optical signal received by a coherent optical receiver (COR) from an optical fiber link; estimating a cross-correlation between the sequence of digital measurements and a temporal sequence of powers of a second optical signal for a plurality of relative time shifts between the sequences, the second and first and second optical signals being in different frequency channels on the optical fiber link, each of the digital measurements representing a phase of the received first optical signal; and identifying a location along the optical fiber link as having a physical change in response to determining that a difference between the estimated cross-correlation and a reference cross-correlation has a magnitude greater than a fixed value for one of the relative time shifts.

BRIEF DESCRIPTION OF THE DRAWINGS

Embodiments disclosed herein will be described in greater detail with reference to the accompanying drawings which represent example embodiments thereof, in which like elements are indicated with like reference numerals, and wherein.

DETAILED DESCRIPTION

Figure 1:
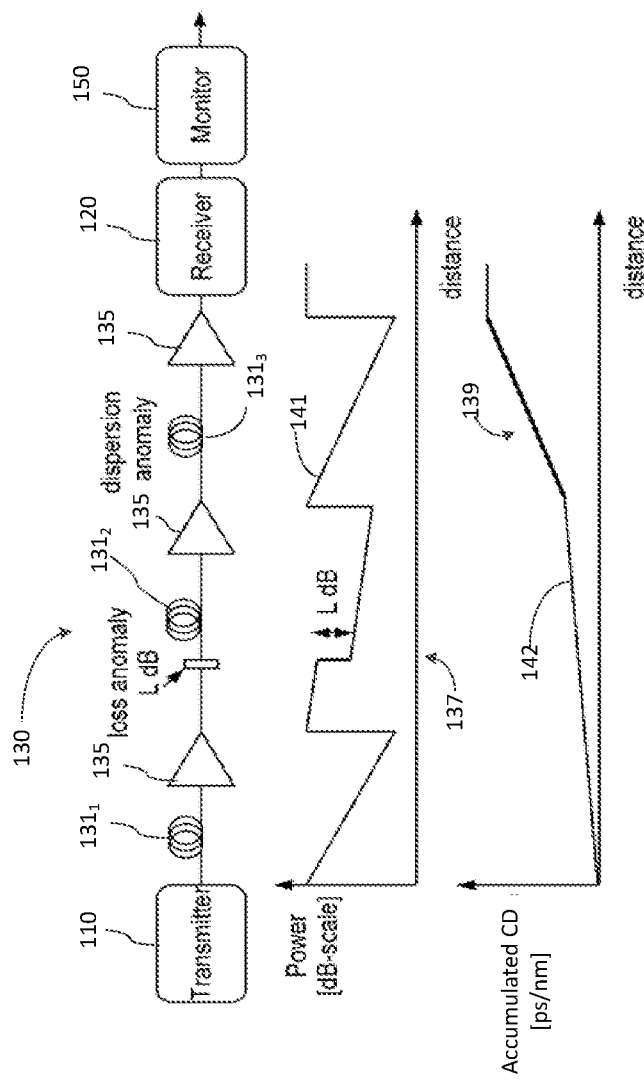
FIG. 1 is a schematic block diagram of an optical fiber link with a receiver-coupled link monitor adapted for monitoring loss and/or dispersion anomalies along the link.

European Patent Application No. 22315133.3, titled "RECEIVER-BASED FIBER-OPTIC LINK MONITOR", by Paolo Serena et al and filed on Jul. 1, 2022, is incorporated herein by reference, in its entirety.

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits may be omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Note that as used herein, the terms "first", "second" and so forth are not intended to imply sequential ordering, but rather are intended to distinguish one element from another, unless explicitly stated. Similarly, sequential ordering of method steps does not imply a requirement of sequential order of their execution, unless explicitly stated. The term "connected" may encompass direct connections or indirect connections through intermediate elements, unless explicitly stated otherwise. The term "polarization channel" is used herein to refer to a transmission path of a particular polarization component of a light signal in an optical transmission system or signal processing apparatus. Different polarization components of a light signal may also be referred to as polarization tributaries, e.g., with reference to a system where they may be separately processed. The term "frequency multiplexing" and its derivatives encompass wavelength division multiplexing (WDM) and coherent frequency multiplexing of optical sub-carriers to create a unified super-channel of a higher data rate. The term "pulse" refers to an elementary waveform that is linearly modulated by one data symbol. The term "walk-off" generally refers to a difference in propagation velocities of two optical carriers. The term "carrier phase" is used herein to refer to a phase $2\pi f \cdot t$ accumulated by a cw optical carrier over a time t, where f is an optical frequency of the optical carrier.

Furthermore, the following abbreviations and acronyms may be used in the present document:
"WDM" wavelength division multiplexing
"NLI" nonlinear interference
"XPM" cross phase modulation
"cPSD" cross spectral power density
"FFT" fast Fourier transform
"IFFT" inverse fast Fourier transform
"PSK" phase shift keying
"M-PSK" PSK with an M-symbol constellation
"BPSK" binary phase shift keying
"QPSK" quadrature phase shift keying
"QAM" quadrature amplitude modulation
"M-QAM" quadrature amplitude modulation with an M-symbol constellation
"IQ" In-phase/Quadrature
"DP" dual polarization
"ADC" analog-to-digital converter
"FEC" forward error correction
"ASE" amplified spontaneous emission
"CUT" channel under test
"DSP" digital signal processor
"NCUT" carrier frequency of CUT
"COT" coherent optical transmitter
"COR" coherent optical receiver
"CD" chromatic dispersion
"OA" optical amplifier
"EDFA" erbium-doped fiber amplifier
"LO" local oscillator
"PD" photodetector
"NZDSF" non-zero dispersion-shifted fiber
"SNR" signal-to-noise ratio
"OSNR" optical SNR
"SMF" single-mode fiber Embodiments described below relate to an apparatus, and a corresponding method, for monitoring changes of optical signal propagation parameters along an optical fiber link of an optical communication system. The apparatus and method employ a receiver-based technique, utilizing cross-phase modulation (XPM) between two frequency-multiplexed optical signals.

An aspect of the present disclosure provides an apparatus comprising: a digital processor (DP) being configured to receive a temporal sequence of digital measurements of a first optical signal received by a coherent optical receiver (COR) from an optical fiber link and being configured to estimate a cross-correlation between the temporal sequence of digital measurements and a temporal sequence of powers of a power-modulated second optical signal for a plurality of relative time shifts between the sequences, the first and second optical signals having been transmitted to the optical fiber link in different frequency channels, each of the digital measurements representing a phase distortion of the received first optical signal at a corresponding time. The DP is configured to identify a location along the optical fiber link as having a physical change in response to a magnitude of a difference between the estimated cross correlation and reference being greater than a fixed value for one of the relative time shifts, and to estimate the location of the physical change from the value of the one of the relative time shifts.

In some implementations, the DP may be configured to estimate that the location is at a distance along the optical fiber line, the distance being about the value of the one of the relative time shifts times a magnitude of a difference between the propagation velocities of the first and second optical signals on the optical fiber line.

In some implementations, the DP may be configured to subtract, from phase measurements of the first optical signal at sampling times, phase decisions corresponding to said phase measurements to obtain the digital measurements. In some implementations, the phase measurements and/or the phase decisions corresponding to said measurements may be obtained from the COR.

In some implementations, the physical change includes a change of at least one of a chromatic dispersion of a segment of the optical fiber link at the location and an optical attenuation of the segment of the optical fiber link at the location.

In any of the above implementations, the apparatus may further comprise the COR. In any of the above implementations, the COR may be configured to determine the digital measurements from measures of the received first optical carrier, at least partially, digitally compensated for chromatic dispersion caused on the first optical signal in the optical fiber line. In any of the above implementations, the COR may be configured to decode for each of the digital measurements a corresponding data symbol value carried by the first optical signal.

In any of the above implementations, the apparatus may further comprise an optical transmitter. In some implementations, the optical transmitter may be configured to transmit the first and second optical signals to the optical fiber link. In some implementations, the optical transmitter may be configured to transmit the second optical signal on an optical supervisor channel and to transmit the first optical signal in the optical telecommunication C-band. In some implementations, the optical transmitter may be configured to transmit the second optical signal over different subcarriers of an optical super-channel.

In any of the above implementations, the DP may be configured to estimate a cross-correlation between the temporal sequence of powers of the second optical signal and a temporal sequence of digital measurements for a first polarization component of the first optical signal for a plurality of relative time shifts between the sequence of powers and the sequence of digital measurements for the first polarization component. In some of such implementations, the DP may be further configured to estimate a cross-correlation between a temporal sequence of digital measurements for a different second polarization component of the first optical signal and the temporal sequence of powers of the second optical signal or a different temporal sequence of powers of the second optical signal.

In at least some of the above implementations the temporal sequence of digital measurements are for a first polarization component of the first optical signal, and the power values of the first temporal sequence of power values comprise a first combination of power values of two different polarization components of the power-modulated second optical signal, and the DP is configured to estimate a cross-correlation between a second temporal sequence of digital measurements of a different second polarization component of the first optical signal, and a second temporal sequence of power values comprising a different second combination of power values of the two different polarization components of the power-modulated second optical signal.

A related aspect of the present disclosure provides a method for monitoring an optical fiber link. The method comprises: at a DP, receiving a temporal sequence of digital measurements of a first optical signal received by a COR from an optical fiber link; estimating a cross-correlation between the sequence of digital measurements and a temporal sequence of powers of a second optical signal for a plurality of relative time shifts between the sequences, the first and second optical signals being in different frequency channels on the optical fiber link, each of the digital measurements representing a phase distortion of the received first optical signal; and identifying a location along the optical fiber link as having a physical change in response to determining that a difference between the estimated cross-correlation and a reference cross-correlation has a magnitude greater than a fixed value for one of the relative time shifts. The method may include estimating the location of the physical change from the value of the one of the relative time shifts.

The method may further include estimating a distance to the location along the optical fiber line as being about the one of the relative time shifts times a magnitude of a difference between the propagation velocities of the first and second optical signals on the optical fiber line.

Some implementations of the method may comprise subtracting, from phase measurements of the first optical signal at sampling times, phase decisions corresponding to said phase measurements to obtain the digital measurements.

In some implementations, the method may further comprise: receiving the first optical signal at the COR from the optical fiber link; and transmitting the phase measurements of the first optical signal from the COR to the DP.

In any of the above implementations, the method may comprise transmitting the first and second optical signals to the optical fiber link such that the second optical signal is on an optical supervisor channel of the optical fiber link and the first optical signal is in the optical telecommunication C-band.

In any of the above or other implementations, the method may include adding a frequency chirp to at least one of the first and second optical signals prior to transmitting thereof over the optical fiber link.

FIG. 1, top panel, schematically illustrates a portion of an optical communication network in which various embodiments may be practiced. The illustrated portion includes an optical fiber link 130 ("the link 130") connecting a coherent optical transmitter (COT) 110 to a coherent optical receiver (COR) 120. A link monitor 150 is coupled to the COR 120 for monitoring one or more parameters related to optical signal propagation along the link 130. In at least some embodiments the link monitor 150 preferably operates by performing measurements on signals received by the COR 120 from the COT 110, without requiring additional measurements at any of the intermediate nodes of the link 130 or any changes to an optical front end of the COR 120. Relevant link parameters to monitor may include, but are not limited to, optical loss along the link 130 and chromatic dispersion (CD) of optical fibers along the link 130.

FIG. 1 illustrates a multi-span link, which includes a sequence of fiber-optic spans $131_i$ ("spans 131") interspersed by optical amplifiers (OAs) 135 to compensate for the optical loss along the link 130. The OAs 135 may be, typically but not exclusively, e.g., Erbium-doped fiber amplifiers (EDFAs). A three-span link is shown for illustration, with the fiber spans 131 including spans $131_1$, $131_2$, and $131_3$, but other embodiments may have the number of fiber-optic spans 131 varying from 1 to 12 or more.

The optical loss along the link, e.g., in the optical fibers of fiber-optic spans 131, at optical connectors, etc., causes the optical signal to lose its power as it propagates along each fiber-optic span 131. The middle panel of FIG. 1 schematically illustrates an example optical power profile 141, along the link 130, for an optical signal transmitted by the COT 110. The optical power profile 141 has a saw-tooth like shape, illustrating optical signal attenuation along each of the fiber-optic spans $131_i$, interspersed by power restorations at the OAs 135.

The number and placement of the OAs 135 are typically determined in relation to a loss budget of the optical fiber link to provide a target optical signal to noise ratio (OSNR) at the receiver, i.e., COR 120. A presence of anomalously high optical loss in the link may cause the OSNR at the receiver to deteriorate. The link monitor 150 may be configured to detect the presence of the anomaly high loss, and may further be configured to estimate the amount of anomalous loss and its approximate location in the link 130. By way of example, the optical power profile 141 illustrates an L dB optical loss anomaly at a location 137 along the second fiber-optic span $131_2$.

Another relevant parameter of the optical fiber link 130 relates to CD in the optical fibers, which causes optical pulses to broaden as they propagated along the link 130. The amount of broadening is determined by the total CD 142 (lower panel in FIG. 1) accumulated by the optical signal as it propagates along the link. Although the CD-induced pulse broadening may be partially compensated for at the COR 120, the total amount of CD the optical signal may be allowed to accumulate for a target system performance may also be limited by a link design budget. Furthermore, as fibers with different CD parameters induce different nonlinear effects, it is valuable to verify the installed fiber types on the field. The link monitor 150 may be configured to detect the presence of fiber spans with abnormally high (or abnormally low) CD, and may further be configured to estimate the amount of anomalous dispersion and/or its approximate location in the link 130. By way of example, the accumulated CD profile 142 shown in the lower panel of FIG. 1 illustrates anomalously high dispersion 139 of the last optical fiber span $131_3$.

Embodiments described below employ a technique to monitor changes in one or more network parameters, such as e.g. optical loss or the CD along an optical fiber link, at a COR physical layer, by performing data-assisted measurements on output signals of the COR to detect inter-channel interference. The technique exploits cross-phase modulation (XPM) between two co-propagating optical signals having different group velocities in the optical fibers of the optical fiber link, e.g. due to different optical carrier frequencies of the two optical signals. The two co-propagating optical signals may correspond, for example, to two different WDM channels, or two optical sub-carriers of an optical super-channel. In at least some embodiments, XPM induced by one of the two co-propagating optical signals in the other is/are detected by digital processing of an output signal of a coherent optical receiver. In some embodiments, the digital processing is data-assisted, making use of a known power modulation pattern of the other of the two optical signals. In some embodiments, the length (duration) of the known power modulation pattern is at least equal to a maximum propagation time difference between the two optical signals in a length of the optical fiber link being monitored due to the signal walk-off between the two signals.

In the following description, the optical signal being analyzed for the XPM is referred to as the first optical signal (e.g. 201, 601 in FIGS. 2, and 6), with the corresponding transmission channel being referred to as the channel under test (CUT). The optical signal inducing the XPM (e.g. 202, 602 in FIGS. 2, and 6) may be referred to as the second optical signal or the probe (optical) signal, with the corresponding transmission channel being referred as the probe channel. In some embodiments, the CUT may be a regular communication channel, e.g. in the optical telecommunication C-band, the L-band, or the S-band, and the probe channel may be a supervisory channel of the optical communication system, which may be out-of-band. In some embodiments, both the CUT and the probe channels may be regular communication channels of the optical communication system, e.g. both in the C-band, the S-band, or the L-band. In some embodiments, the CUT and the probe channel may be supervisory channels of the optical communication system.

The link-monitoring technique employed by example embodiments exploits pulse collisions under conditions of a signal walk-off, when the two optical signals propagate at different speeds, e.g. due to a frequency spacing between the two corresponding optical channels and the CD of the optical fiber. By cross-correlating a power modulation pattern of the probe optical signal with a time sequence of digital measurements, e.g. phase distortion samples, of a corresponding segment of the first optical signal received by a coherent optical receiver, e.g., the COR 120, a link monitor (e.g., 150) may estimate an approximate location of a propagation-affecting change in the optical fiber link (e.g., 130). The cross-correlating may be configured to detect XPM induced by a sequence of pulses of the probe optical signal upon a corresponding sequence of pulses of the first optical signal propagation time lags at the times of the XPM-inducing events, e.g., two-pulse collisions. The approximate location of different XPM-inducing events may then be estimated based on a time lag between the colliding pulses of the two optical signals and a known group velocity difference between the first and second optical signals.

Figure 2:
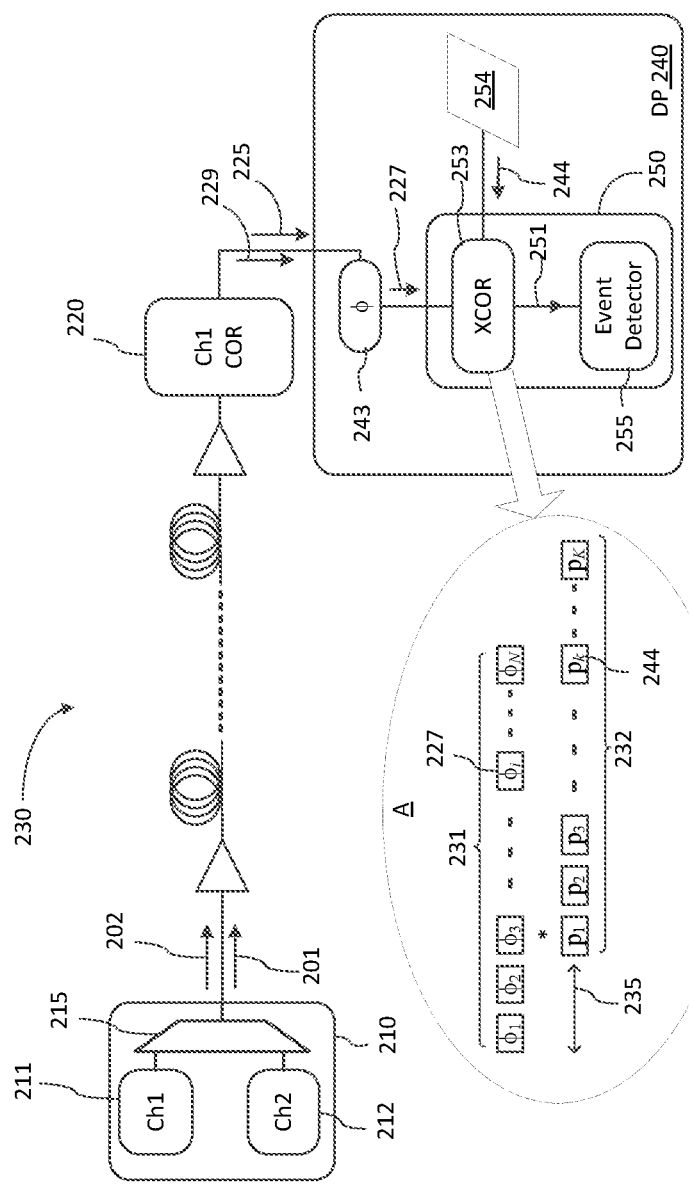
FIG. 2 is a schematic block diagram of an embodiment of optical fiber link of FIG. 1 using nonlinear cross-channel interference for link monitoring.

FIG. 2 illustrates an optical communication system having at least some of the features outlined above. A coherent optical transmitter (COT) 210 is configured to launch two frequency-multiplexed optical signals, a first optical signal 201 and a second optical signal 202, into an optical fiber link 230, where the two optical signals co-propagate for at least some distance, with at least the first optical signal 201 being received by a COR 220 at an opposite end of the optical fiber link 230. The optical fiber link 230, the COT 210, and the COR 220 may be embodiments of the optical fiber link 130, the COT 110, and the COR 120 of FIG. 1, respectively.

Figure 3A:
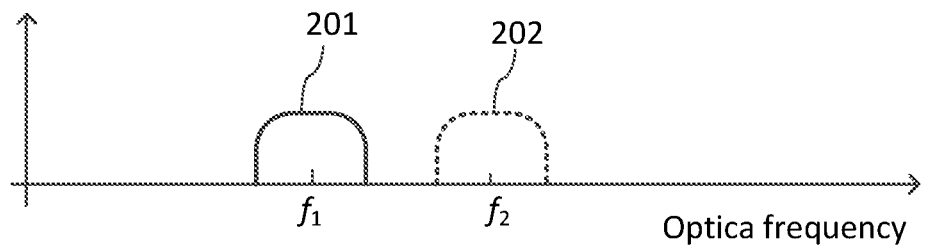
FIG. 3A is a schematic diagram illustrating optical spectra of a channel under test ("CUT", solid line), and a probe channel (dashed line)

The first and second optical signals 201 and 202 are modulated by the COT 210 to carry streams of digital data symbols. The second optical signal 202 is modulated at least in power, and is shifted in optical frequency from the first optical signal 201 by a frequency shift $\Delta f_{1,2}=(f_2-f_1)$, e.g. as illustrated in FIG. 3A; here $f_1$ is the optical carrier frequency of the first optical signal 201, and $f_2$ is the optical carrier frequency of the second optical signal 202. In some embodiments, the first and second optical signals 201 and 202 may be generated with respective signal generators 211 and 212, and frequency multiplexed by a multiplexer 215. In some embodiments, the signal generators 211 and 212 may each include an optical modulator coupled at its input to a coherent optical source generating light at the optical carrier frequencies $f_1$ and $f_2$, respectively, and the multiplexer 215 may be a wavelength multiplexer. In some embodiments, the signal generators 211 and 212 and the multiplexer 215 may operate in electrical domain to output a frequency-multiplexed electrical signal, which is then modulated onto an optical carrier to form an optical super-channel, with the two carrier frequencies $f_1$ and $f_2$ being sub-carriers thereof.

The COR 220 is configured to perform sampling measurements on the received optical signal 201 for decoding therefrom the transmitter-modulated data symbols. The sampling measurements performed by the COR 220 may also be used by a digital processor (DP) 240 to monitor physical changes along the optical fiber link 230. In some embodiments, the DP 240 may be co-located with the COR 220. In some embodiments, the DP 240 may be implemented at least in part using a digital signal processor (DSP) of the COR 220. In some embodiments, the DP 240 may be located remotely from the COR 220, and receive digital data therefrom over a suitable communication channel.

In an example illustrated in FIG. 2, the DP 240 is configured to receive from the COR 220 a stream of digital measurements 223 of the first optical signal 201 representative of a phase of the first optical signal 201 at sampling times. The DP 240 is further configured to and obtain therefrom a temporal sequence 231 of digital measurements 227, each of which representing a phase distortion of the received first optical signal 201 at a corresponding sampling time. A digital measurement representative of a phase of a received optical signal may, e.g., refer to the phase sample of the received optical signal as measured by a front end of a corresponding COR, e.g. COR 220, or, preferably, a processed form of such measure, e.g., to correct for carrier frequency estimation, sampling timing errors, to compensate for the CD, to remove therefrom a decoded symbol phase value, etc. The DP 240 is further configured to estimate, e.g. using a digital cross-correlator 253, a cross-correlation 251 between the temporal sequence 231 and a temporal sequence 232 of power values 244 of the second optical signal 202 for a plurality of relative time shifts $\tau_n$ 235 between the sequences 231 and 232. Temporal sequences 231 and 232 with a relative time shift 235 therebetween are schematically illustrated in an insert "A" in FIG. 2 for an example embodiment. The temporal sequence of power values 232 may also be referred to herein as the power modulation pattern of the second optical signal 202. Each of the digital measurements 227 represents a phase distortion $\phi_i$ of the received first optical signal 201 at a corresponding, e.g. sampling, time, e.g. $t_i$. The DP 240 may be further configured to identify a location along the optical fiber link 230 as having a physical change in response to a magnitude of the cross-correlation 251 being greater than a threshold.

In the illustrated embodiment, the DP 240 includes digital circuits implementing a link monitor 250, which may be an embodiment of the link monitor 150 of FIG. 1 to monitor changes of the optical fiber link 230 along a length thereof where the signals 201 and 202 co-propagate. In some embodiments the link monitor 250 may be preceded by a phase distortion estimation (PDE) unit 243 as further described below. In some embodiments, the PDE unit 243 may be implemented within the DP 240. In some embodiments, the PDE unit may be implemented at least in part inn a DSP of the COR 220. The link monitor 250 includes a cross-correlation estimator 253 configured to estimate the cross-correlation 251 using the power modulation pattern 232. The cross-correlation 251 for a particular relative time shift 235 is indicative of XPM of the first optical signal 201 induced by the second optical signal 202 at a particular portion of the optical fiber link 230. The power modulation pattern 232 may be e.g., stored in a memory device 254 associated with the DP 240. The link monitor 250 may further include a link event detector 255 configured to detect changes in the optical fiber link 250, and estimate approximate locations of the changes, based at least in part on the cross-modulation 251 as a function of the relative time shift 235.

Figure 3B:
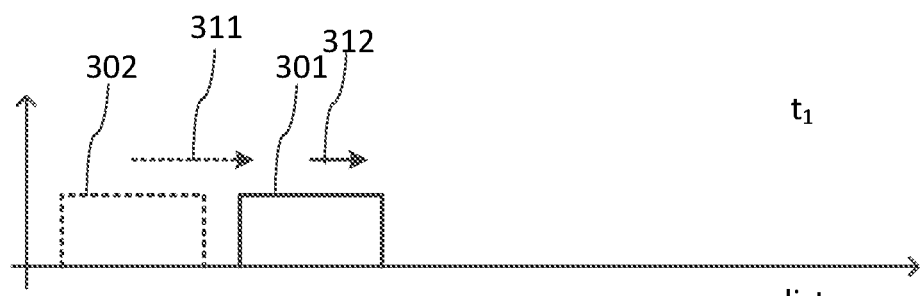
FIGS. 3B, 3C, and 3D are schematic diagrams illustrating colliding pulses of the CUT and probe channels before, during, and after the collision, respectively.
Figure 3C:
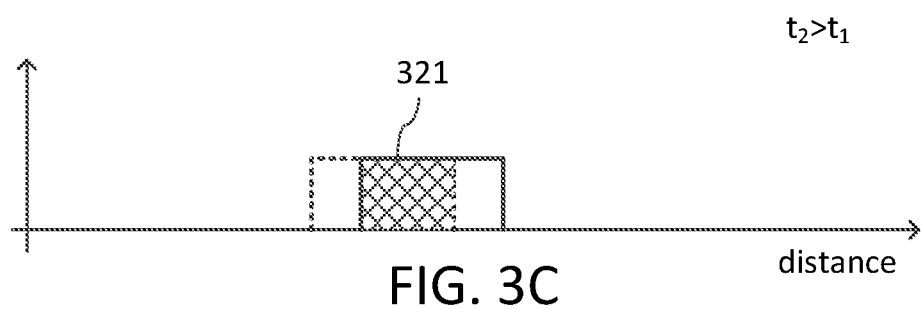
Figure 3D:
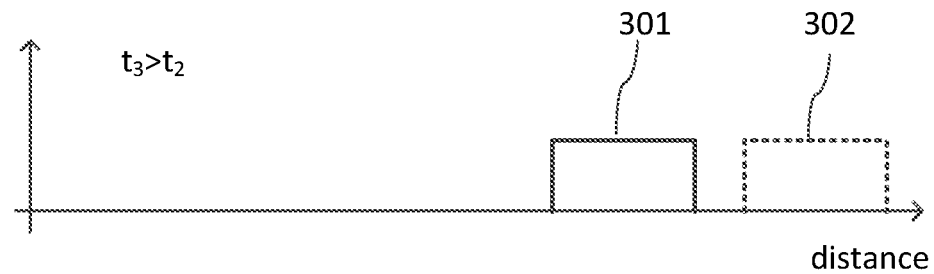

FIGS. 3B-3D schematically illustrate the propagation of two pulses, 301 and 302, of the first and second optical signals 201, 202 along a length of the optical fiber link 230. Pulse 301 represents a pulse of the first optical signal 201, and pulse 302 represents a pulse of the second optical signal 202. Here, the term "pulse" refers to an optical field for a particular symbol of a data signal carried by a corresponding optical signal, which may or may not be power-modulated. Pulse 301 has been transmitted by the COT 210 at an earlier time than pulse 302, and has traveled a longer distance along the link at a time instance $t_1$ of FIG. 3B, but is moving at a lower velocity 312 than the velocity 311 of pulse 301, due to the carrier frequency shift $\Delta f_{12}$ and the CD in the optical fiber link 230, resulting in a pulse walk-off. At a time instance $t_2 > t_1$ illustrated in FIG. 3C, pulse 302 is caught up and "collides" with pulse 301, inducing an XPM in an overlap region 321. At a time instance $t_3 > t_2$ illustrated in FIG. 3D, pulse 302 overtakes pulse 301, no longer overlapping therewith. Thus, the collision between the two pulses 301, 302 has a final duration and occurs over a finite segment of the optical fiber link 250, and the XPM induced by the collision carries a signature of that particular segment of the link.

Figure 4A:
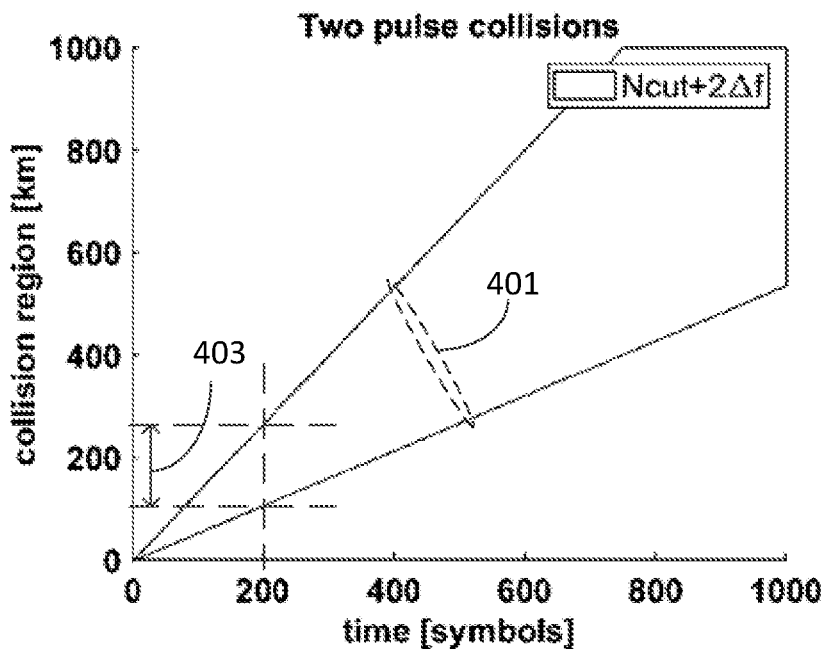
FIGS. 4A and 4B are a schematic diagram illustrating a two-pulse collision region of an optical fiber link, composed of typical SMF fibers, as a function of a signal walk-off at the time of the collision, expressed in terms of symbol intervals, for a symbol rate of 64 Gbd; the channel frequency spacing is 150 GHz in FIG. 4A, and 225 GHz in FIG. 4B.
Figure 4B:
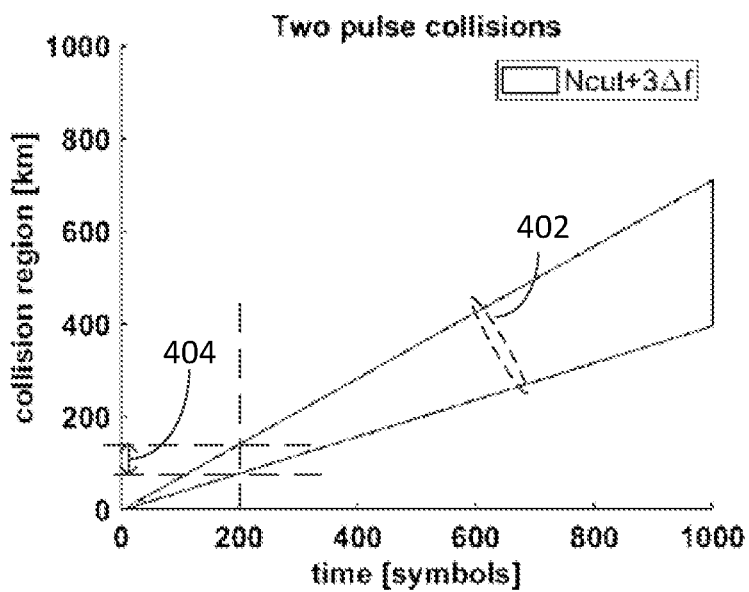

FIGS. 4A and 4B illustrate example pulse collision regions 401 and 402 for two different frequency shifts $\Delta f_{12}$ between the first and second optical signals 201 and 202 (the CUT and the probe channel), $\Delta f_{12} = 2\Delta f = 150$ GHz in FIG. 4A and $\Delta f_{12} = 3\Delta f = 225$ GHz in FIG. 4B; here $\Delta f$ denotes e.g., a frequency spacing between adjacent channels of the frequency-multiplexed optical signal for an example embodiment. In the illustrated example, the symbol rate in both channels is 64 Gbd, the optical fiber link 230 employs a single-mode fiber (SMF) with a dispersion coefficient of 17 ps/nm/km. The horizontal axis corresponds to a walk-off time between the two optical signals in units of symbol intervals. For instance, in the embodiment of FIG. 4A, with $\Delta f_{12} = 150$ GHz, the collision region 403 of an i-th pulse 301 of the first optical signal 201 with the k=(i+200)-th pulse 302 of the second, or probe, optical signal 202, extends between about 107 km and 267 km of the optical fiber link. In the embodiment of FIG. 4B, with $\Delta f_{12} = 225$ GHz, the collision region 404 for these two pulses is proportionally narrower and extends between about 80 km and 142 km. Here the pulse counts i and k are synchronized so that i=0 and k=0 indicate approximately the same transmission time, e.g. within about half of a symbol interval.

Referring back to FIG. 2, the COR 220 is configured to output a stream of digital measurements 225 comprising phase information for the first optical signal 201. In some embodiments, the digital measurements 225 may be complex-valued signal samples. In some embodiments, the digital measurements 225 may be measurements of a phase of the first optical signal 201 relative to its carrier phase $2\pi f_1 t$. In some embodiments, the digital measurements 225 may be phase distortion samples as described below. In some embodiments, the PDE unit 243 may be provided to process the digital measurements 225 to remove therefrom corresponding symbol phase decisions 229. The cross-correlation 251 comprises information about XPM-induced content of the digital measurements 227 induced in the first optical signal 201 by collisions with pulses of the second optical signal 202. The cross-correlation 251, as a function of the relative time shift $\tau_n$, may be referred to herein as the XPM pattern and may be described e.g., by a cross-correlation function c(n) or a cross-correlation vector $\{c_n\}$, where n is an integer counter of the relative time shift $\tau_n$. The cross-correlation 251 comprises signatures of different segments of the optical fiber link 230, which locations along the link may be mapped to the relative time shifts $\tau_n$. The cross-correlation 251 may further comprise an estimate of a pulse collision tensor $X_{kkii}$, as described below.

In some embodiments, the cross-correlation 251 may be analyzed, e.g., by a link event detector 255, to relate the relative time shifts $\tau_n$, or the corresponding integer shifts n, to propagation time lags between the signals 201, 202 as the signals co-propagate along the length of the optical fiber link, as further described below. The link event detector 255 may be configured to detect a physical change in the optical fiber link 250, and estimate approximate location of the changes based at least in part on a value of the cross-correlation 251 for the corresponding propagation time lag. In an embodiment, the link event detector is configured to generate a threshold crossing alert (TCA) when the cross-correlation 251, or a change thereof relative a reference, is greater in magnitude than a fixed value.

The power modulation pattern 232 represents pulse power modulation for a segment of the second optical signal 202. In an example embodiment, the first and second optical signals 201, 202 are optical carriers modulated at the COT 210 with streams of digital data symbols $a_i$ and $b_k$, respectively, where i and k are the symbol counters in the respective streams. The first optical signal 201 may use any modulation format, including but not limited to PSK, e.g., QPSK, BPSK, M-PSK, QAM, and PAM. The second optical signal 202 may use any modulation format in which symbol power varies, i.e., excluding pure PSK formats.

The power modulation pattern 232 may be e.g. a temporal sequence $\{p_k\}$ of power values ("powers") $p_k = |b_k|^2$ for a K-long sequence $\{b_k\}$ of digital data symbols $b_k$ of the second optical signal 202, where K is the number of symbols in the sequence. In some embodiments, the power values, or "powers", $p_k$ may be relative to an average, or DC, value thereof $<|b_k|^2>$ for the sequence, e.g. $p_k=(|b_k|^2-<|b_k|^2>)$, so that $<p_k>=0$. In one embodiment, the sequence $\{b_k\}$ may be a pre-determined probe sequence for which the sequence of symbol power values $\{p_k\}$ is stored at the DP 240 or externally to the COR 220. For example, the sequence $\{b_k\}$ may include pilot symbols of a supervisory channel. In other embodiments, the sequence of symbol power values $\{p_k\}$ may be reconstructed by the COR 220 from the received second optical signal 202, e.g. using FEC-assisted detection, or operating at a high OSNR for the second optical signal.

In some embodiments, e.g. when the first and second optical signals are polarization multiplexed, the power modulation pattern 232 may be e.g. a sequence of power values $p_{kx,y}$ combining power values of corresponding k-th symbols in X- and Y-polarization tributaries of the probe optical signal 202, as described below.

In some embodiments, the cross-correlation estimator 253 computes the cross-correlation function $\{c_n\}$ 251 between the sequence 232 of symbol power values $\{p_k\}$ 244 for the second optical signal 202 and a sequence 231 of phase samples $\{\phi_k\}$ 227 obtained by the COR 220 or DP 240 for a co-propagating segment of the first optical signal 201, in accordance with equation (1):

$$c_n = E\{\phi_i p_{i-n}\} c_n = E\{\phi_i p_{i-n}\} \quad (1)$$

Here $E\{.\}$ denotes statistical expectation, which may include averaging over a plurality of measurements.

In an embodiment, the sequences of the phase samples $\{\phi_i\}$ and the power values $\{p_k\}$ are of the same length K, i.e., with integer indices i, k=0, ..., K−1 indicating consecutive sampling times for the first (201) and second (202) optical signals, respectively, e.g. one per respective symbol interval. Estimating the cross-correlation $c_n$ may include averaging over pairs of the phase samples and power values, $\{\phi_i, p_{i-n}\}$, with the same "symbol lag" n therebetween, e.g. in accordance with equation (2):

$$c_n = a \sum_{i=0}^{K-1} \phi_i p_{i-n} \quad (2)$$

where a is a normalization constant. The sequence $\{p_k\}$ in equation (2) may be circularly extended, e.g. so that $p_{-n} = p_{K-1-n}$ for n>0.

Figure 5:
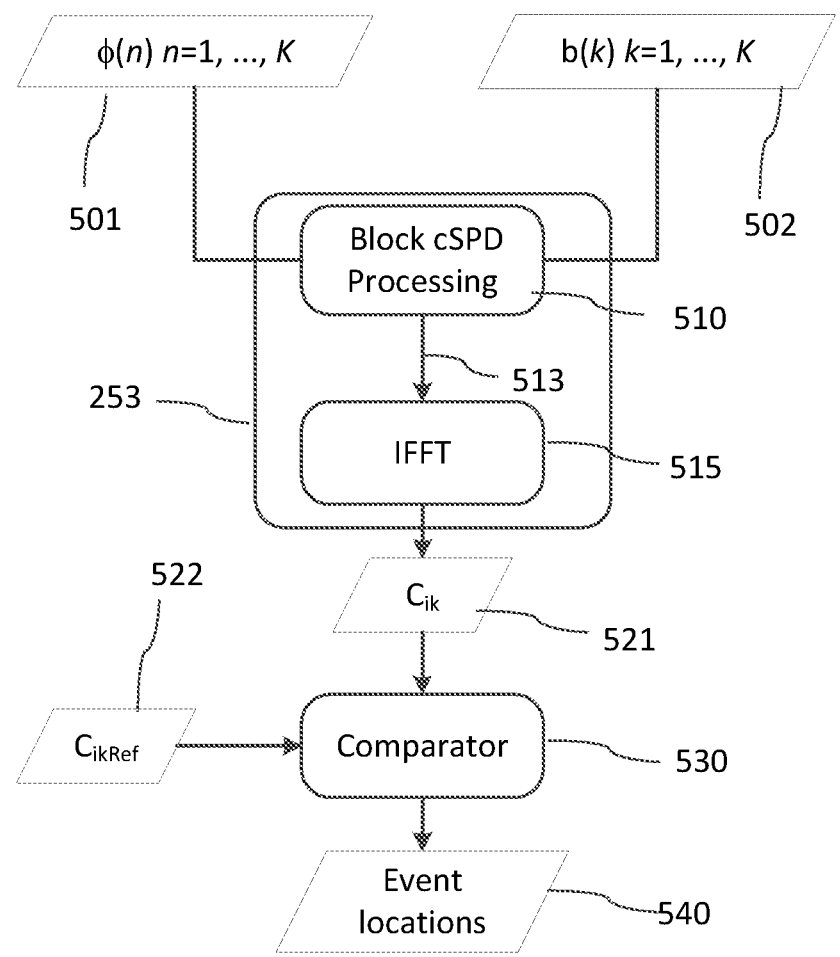
FIG. 5 is a schematic functional block diagram of a link monitor according to an embodiment.

The operations in the right-hand side (RHS) of equation (1) or equation (2) may include, for example, computing the quantities $c_n$ by first computing the cross power spectral density (cPSD) for the sequences $\{p_k\}$ and $\{\phi_i\}$, followed by an inverse discrete Fourier transform of a resulting periodogram, e.g., as illustrated in FIG. 5.

In some embodiments, the phase samples $\phi_i$ in equations (1) and (2) may be phase distortion samples, which may be obtained by removing a transmitter-generated phase modulation from phase measurements of the received first optical signal 201. In some embodiments, the transmitter-generated phase modulation component may be determined based on hard symbol phase decisions 229 on the complex-valued signal samples $s_i = r_i \cdot \exp(j \cdot \psi_i)$, and the phase samples $\phi_i$ are generated by removing the symbol phase decisions 229 from the complex-valued signal samples $s_i$. Here $r_i$ denotes the carrier amplitude samples. The complex-valued signal samples $s_i$ are typically generated by the COR 220 by, e.g., sampling the in-phase and quadrature components of the received first optical signal 201 in the baseband.

Referring again to FIG. 2, in some embodiments the PDE unit 243 may be provided to remove the phase modulation component from the digital measurements 225. In some embodiments, the digital measurements 225 may be in the form of a stream of phase measurements $\psi_i$, and the PDE unit 243 may be configured to subtract therefrom the phase $\psi_{di}$ of the hard symbol decisions 229, e.g. in accordance with equation (3)

$$\phi_i = \psi_i - \arg(d_i), \quad (3)$$

where $d_i$ denotes a hard decision on a complex signal sample $s_i$, and the arg(.) function is the argument of the complex number.

In some embodiments, the digital measurements 225 may be in the form of a stream of the complex signal samples $s_i$, and unit 243 may be configured to first generate a sequence of complex distortion samples $u_i$ therefrom, e.g. in accordance with $u_i = s_i \cdot \exp(-j \cdot \psi_{di})$, where $\psi_{di} = \arg(d_i)$ is a hard symbol phase decision. The phase distortion sample $\phi_i$ may then be estimated as the phase, $\arg(u_i)$, of the complex distortion sample $u_i$. In some embodiments, unit 243 may be configured to estimate the phase distortion sample $\phi_i$ as the ratio $y_i/x_i$, where $x_i$ and $y_i$ are the real and imaginary parts of the complex distortion sample $u_i$. In some embodiments, unit 243 may be configured to first generate the phase measurements $\psi_i$ from the complex signal samples $s_i$, and then estimate the phase distortion samples $\phi_i$, e.g. based on equation (3).

A value of the cross-correlation $c_n$ 251 for a particular n represents a scaled estimate of an average XPM of the first optical signal 201 due to collisions with pulses of the second optical signal 201 shifted by n symbol intervals. The symbol lag n may be mapped to a location of the XPM-causing collision event relative to a reference location along the optical fiber link, e.g. the coordinate where the probe optical signal 202 enters in the optical link 230 to co-propagate with the first optical signal 201. The value $c_n$ may thus comprise a signature of the optical fiber link at a specific location along the link defined by the symbol lag n. In an embodiment, the distance D from a reference location to a $c_n$ anomaly detected for a particular symbol lag n may be estimated to be about the value of the relative phase time shift $\tau_n = T^* n$, times a magnitude $|\Delta v_g|$ of a difference $\Delta v_g$ between the propagation velocities of the first and second optical signals 201, 202 on the optical fiber line: $D \cong T \cdot n \cdot |\Delta v_g|$, where T is the symbol interval and $\Delta v_g$ is the group velocity difference between the two optical signals 201, 202 in the optical fiber link 230.

In some embodiments, the DP 240 is configured to synchronize the temporal sequences $\{p_k\}$ and $\{\phi_i\}$ so that, e.g., the counters k=0 and i=0 correspond to symbols or pulses of the two optical signals 201, 202 transmitted through a reference location along the optical fiber link 230 at approximately the same time, e.g. within half a symbol period from each other. The symbol lag n is then a function of the propagation time difference between the colliding pulses of the two optical signals from the reference location to the location of the pulse collision, and therefore is directly indicative of the pulse collision location along the optical fiber link.

In the example embodiment illustrated in FIG. 2, both optical signals 201 and 202 are transmitted by the same COT 210, and the reference location may correspond, e.g. to an end of the optical fiber link 230 coupled to the COT 210. In some embodiments, the reference location may be e.g. a location of an intermediate OA. In some embodiments, the second optical signal 202 may be transmitted by a different COT, and may enter the optical fiber link 230 at a different location therealong, e.g. using a wavelength multiplexer (MUX) or a wavelength selective switch (not shown); in such embodiments, the reference location may be, e.g.

where the second optical signal 202 enters the optical fiber link 230, or at a first OA thereafter.

In some embodiments, e.g. when the first and second optical signals 201, 202 are transmitted by a same COT as illustrated in FIG. 2, the synchronization of the sequences may be pilot-assisted; e.g. the COT 210 may transmit one or more known pilot symbols in the CUT that synchronously with transmitting, e.g., a forward end of the power-modulation pattern 232 in the probe channel. In such embodiments, the COR 220 or the DP 240 may be configured to detect the one or more known pilot symbols, to suitably determine the forward end of the temporal sequence 231 of the digital measurements 227 to be correlated with the power modulation pattern 232. In some embodiments, the DP 240 may be configured to synchronize a test temporal sequence of the digital measurements 227 to a stored power modulation pattern 232 based on a magnitude of the cross-correlation $c_n$, e.g. by detecting peaks in $c_n$ as a function of n, which may indicate location of OAs along the optical fiber link 230, and assigning n=0 to $c_n$ at the first peak. Once the two temporal sequences are synchronized, i.e. one of the digital measurements 227 that aligns at the transmission with the first one of the power values $p_k$, i.e. $p_k$=0, is determined, a new temporal sequence 231 of the digital measurements 227, which suitably aligns with the stored power modulation pattern 232 and has the desired length K, maybe selected, and used to compute an update cross-correlation $c_n$.

In an embodiment, the length K of the stored power modulation pattern 232, e.g. of the form of the probe sequence $\{p_k\}$, may be selected to be large enough, i.e. i.e. K≥τ·$R_B$, to accommodate a maximum time lag τ=L/$\Delta v_g$, i.e. the propagation time difference between the first and second optical signals 201, 202 in a length L of the optical fiber link 230 being monitored; here $\Delta v_g$ is the group delay difference between the first and second optical signals, and $R_B$ is the largest symbol rate of the two channels.

In some embodiments, computing the cross-correlation 521 may include averaging over a plurality of temporal sequences 231 of digital measurements 227, cross-correlating each with a corresponding power modulation pattern $\{p_k\}$ of the second (probe) optical signal. This may include, e.g., averaging over a plurality of cPSD periodograms to obtain a single cPSD periodogram. In an example embodiment, the plurality of sequences 231 of phase distortion samples may be detected for different segments of the first optical signal, each transmitted approximately simultaneously with, e.g., a sequences of pilot symbols of a probe optical signal, e.g., in a supervisory channel.

FIG. 5 illustrates a functional block diagram of the link monitor 250 for an example embodiment. The cross-correlation estimator 253 includes a cPSD computing unit 515 followed by an IFFT computing unit 515 to estimate the cross-correlation 521 between the sequence of symbol power values $\{p_k\}$ and a sequence 501 of the phase distortion samples $\{\phi_n\}$. The cPSD computing unit 515 computes an estimate of the cPSD 513 for the two sequences 501 and 502, e.g., using the Welch's method known in the art. In an embodiment, the cPSD computing unit 515 may perform a sequence of signal processing operations including i) dividing the pair of sequences 501 and 502 into a plurality of equal-size blocks, which may overlap, each of the blocks containing corresponding segments of the two sequences 501 and 502, ii) for each block, applying a window function to each segment, computing a pair of periodograms for the pair of segments, e.g., using a discrete Fourier transform, and performing an element-by-element multiplication of the two periodograms, and iii) averaging the resulting single-block product periodograms over all blocks. This process produces the cPSD estimate 513, which is then provided to the IFFT unit 530 to perform an IFFT operation to compute the cross-correlation function $\{c_n\}$.

The XPM cross-correlation vector 521 is passed to a comparator unit 530, which may perform at least some of the functions of the link event detector 255. The comparator unit 530 compares the cross-correlation vector $\{c_n\}$ to a stored reference cross-correlation vector 522, which represents the cross-correlation 521 obtained for a reference, e.g., non-perturbed, state of the optical fiber link 250. In some embodiments the comparator 530 may, for example, compute an element-by-element difference between the estimated cross-correlations 521 and the reference cross-correlations 522, and then detect elements of the difference matrix or vector exceeding in value corresponding threshold values to estimate an approximate location of a link event. In some embodiments, a machine learning algorithm may potentially be used to determine whether the detected anomaly relates to e.g. a change in optical loss or a change in CD.

Figure 6:
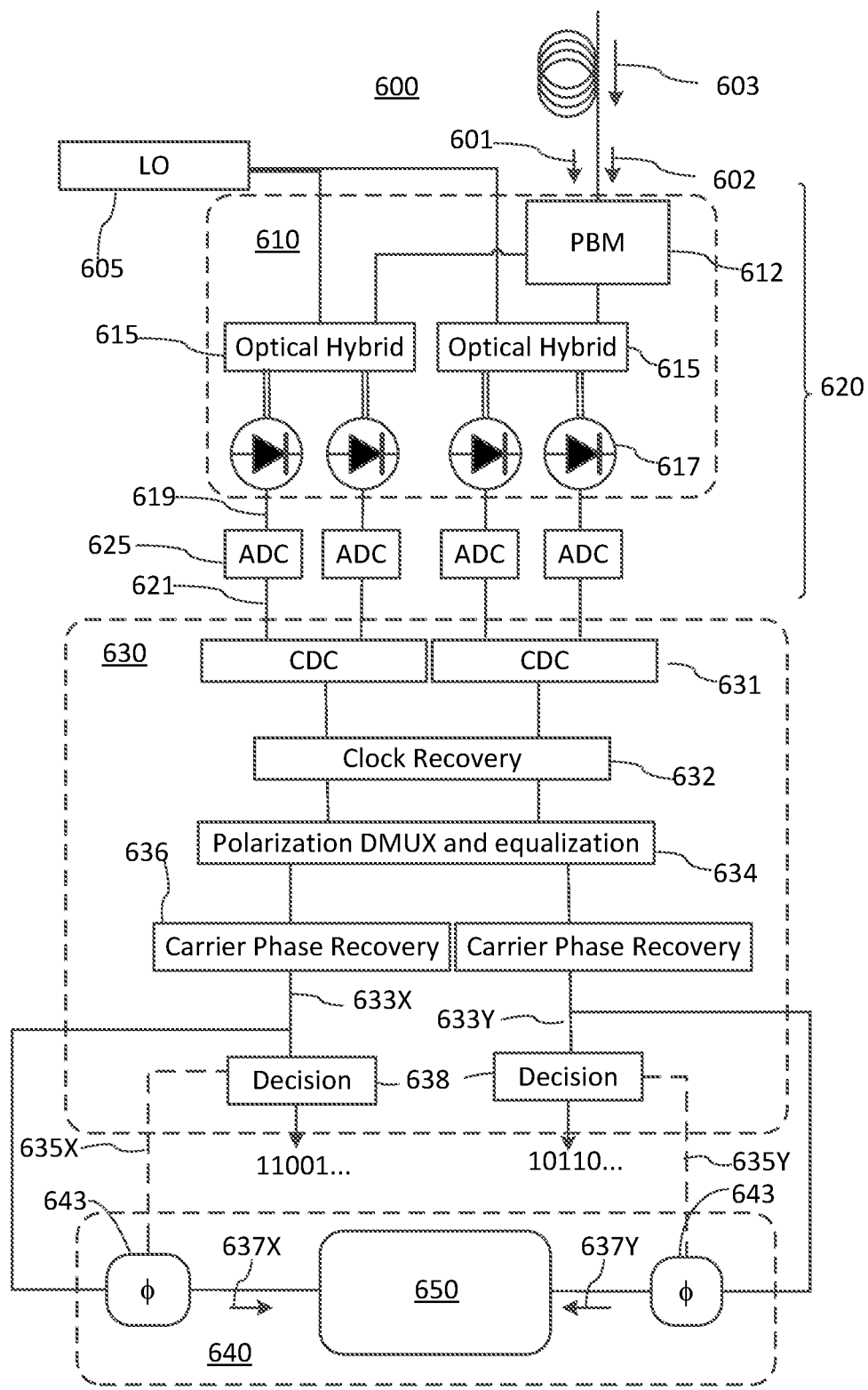
FIG. 6 is a schematic block diagram of a dual-polarization coherent optical receiver coupled to a link monitor.

FIG. 6 illustrates a block diagram of a dual-polarization COR 600, which is coupled to a DP 640 implementing a link monitor 650 according to an embodiment. The DP 640 and the link monitor 650 may be embodiments of the DP 240 and the link monitor 250 described above. The COR 600 is configured to receive a light signal 603 from an optical fiber link, e.g. link 230 of FIG. 2. The light signal 603 may include first and second optical signals 601, 602, which may be embodiments of the first and second optical signals 201, 201 described above with reference to FIGS. 2-5 and have corresponding optical carrier frequencies $f_1$ and $f_2$.

The first and second optical signals 601, 602 may be each polarization-multiplexed at a corresponding remote COT to comprise two polarization tributaries, hereinafter referred to as X and Y, carrying corresponding modulation signals at the respective first or second optical carrier frequency $f_1$ or $f_2$. In some embodiments the input light signal 603 may be absent of the second light signal 602, e.g. if the second light signal has been de-multiplexed prior to the COR 600 or dropped at an intermediate node of the optical fiber link.

The light signal 603 is provided to an optical-to-electrical (OE) converter 610, which is coupled to a DSP 630. The OE 610 implements a polarization-diversity homodyne-detection or intradyne-detection of the first optical signal 601 to output electrical signals 619 separately for two orthogonal polarizations of the received first light signal 601. The DSP 630 is configured to de-convolve the modulations of the X- and Y-polarizations of the first optical signal 601 from the electrical signals 619, and to generate streams of complex signal samples 633X and 633Y for the X- and Y-polarization tributaries of the first optical signal 601, respectively. The complex signal samples 633X and 633Y may be generally referred to hereinafter as signal samples 633, or the digital measurements 633. The signal samples 633 comprise a phase component representing the carrier phase modulation of the corresponding polarization tributaries of the first optical signal 601, distorted by the propagation in the optical fiber link. The signal samples 633 are provided to decision gates 638 for generating hard symbol decisions thereon, which comprise (hard) symbol phase decisions.

In some embodiments, the streams of signal samples 633X and 633Y are provided to corresponding PDE units 643 to extract phase samples 637X and 637Y therefrom, which may be generally referred to as phase samples 637. In some embodiments the phase samples 637 are phase distortion samples, with corresponding hard symbol phase decisions removed, to represent accumulated carrier phase distortions of the corresponding polarization tributaries of the first optical signal 601 due to the propagation in the optical fiber link, including the non-linear XPMs due to the pulse collision interactions with the second optical signal 602 as the two optical signals co-propagate along the optical fiber link. One or both of the streams of the phase samples 637X, 637Y may then be provided to the link monitor 650 for computing the cross-correlation function(s) with one or more power modulation patterns of the second optical signals 602 as described above and estimating the XPMs induced in the first optical signal 601 by the second optical signal 602 during their co-propagation in the fiber optical link.

In an example embodiment shown in FIG. 6, the OE converter 610 comprises a polarization beam splitter (PBS) 612 configured to decompose the light signal 601 into two orthogonally polarized components. Light of each of the two polarization components is then provided to a corresponding optical hybrid 615 wherein it is mixed with a correspondingly polarized local oscillator (LO) light from a laser source 605. In an embodiment, laser source 605 is configured to emit coherent light at optical frequency approximately equal to the carrier frequency $f_1$ of the first optical signal 601. Each of the optical hybrids 615 operates to output four mixed optical signal in which portions of the light signal 601 are coherently mixed with portions of the LO light with a 90° phase shift increment. The four mixed optical signals from each optical hybrid 615 are detected by corresponding two balanced photodetectors (PDs) 617, to provide electrical signals 619 corresponding to the in-phase (I) and quadrature (Q) modulation signal components for each of the respective polarization components of the received light. The electrical signals 619 from the balanced photodetectors 617 are provided to analog-to-digital converters (ADCs) 625. The ADCs 625 sample the corresponding electrical signals 619 at a suitable sampling frequency to produce digital electrical signals 621 comprising phase modulation and distortion information for the first optical signal 601. In some embodiments, the electrical signals 619 may be amplified and optionally filtered prior to the sampling.

In an example embodiment, the DSP 630 operates to perform: (i) signal equalization; (ii) clock recovery; and (iii) carrier- and data-recovery (CDR) processing. In the illustrated embodiment, the DSP 630 includes chromatic dispersion compensation (CDC) modules 631, followed by digital clock recovery circuitry (CRC) 632, which is in turn followed by polarization de-multiplexing circuitry (p-DMUX) 634, and carrier phase estimation (CPE) modules 636. The CDC modules 631 are configured to at least reduce, or substantially cancel, the detrimental effects of CD in the optical fiber link upon the first optical signal 601, such as e.g. inter-symbol interference (ISI) due to the group delay dispersion and the resulting pulse broadening. The CRC 632 may operate to recover a symbol clock used at the remote COT and to synchronize thereto various digital data streams in DSP 630, e.g. for controlling the rate and phase of a clock signal applied to ADCs 625. The p-DMUX 634 is configured to perform MIMO processing to de-convolve modulation signals of the X and Y polarization tributaries of the first optical signal 601 from the streams of digital samples received for the two polarization outputs of the PBS 612. The CPE modules 636 operate at the outputs of the p-DMUX 634 to generate the streams of digital measurements 633X, 633Y, e.g. in the form of streams of complex samples of the received signal for each polarization tributary. Decision gates 638 perform hard decisions on the complex samples 633 to generate hard decisions 635, which may be complex-valued. The complex samples 633X, 633Y are provided to respective PDE units 643, each of which may be an embodiment of unit 243 described above with reference to FIG. 2, and is configured to generate respective phase samples 637X or 637Y. In one embodiment, the PDE units 643 also receive the hard decisions 635X, 635Y and is configured to remove hard symbol phase decisions from corresponding phase measurements as described above, so that phase samples 637X and 637Y represent phase distortion samples for the X and Y polarization tributaries of the first optical signal, respectively.

In an illustrative embodiment, a remote COT may modulate an optical carrier of the first optical signal 601 with complex symbols $A_k \cdot \exp(j\theta_k)$. An optical filed $E_k$ for each symbol at the COR 600 may be approximately described as $E_k = r_k \exp[j(\theta_k + \beta_k + \alpha_k)]$, where $\beta_k = 2\pi f_1 t_k$ is the carrier phase for the k-th transmitted symbol, and $\alpha_k$ denotes the phase distortion of the k-th symbol due to e.g. ASE noise, transmission nonlinearity, laser phase noise, etc. Each CPE module 636 of COR 600 may generate an estimate $\widehat{\beta_k}$ of the carrier phase $\beta_k$ and may output complex sample $s_k = r_k \exp[j(\theta_k + \beta_k - \widehat{\beta_k} + \alpha_{rk})] = r_k \exp(j\psi_k)$, with phase measurements $\psi_k = \theta_k + \beta_k - \widehat{\beta_k} + \alpha_{rk}$. Here $\alpha_{rk}$ denotes phase distortions accumulated by the signal along the transmission path up to and including the decision gates 638, including ASE noise, nonlinearity distortions including the XPM in the optical link, laser phase noise, other phase distortions due to e.g. transponder imperfections, imperfect compensation of CD, GAWBS, thermal photodiode noise, IQ imbalance, the mismatch "noise" due to imperfect phase recovery, the mismatch "noise" due to errors in symbol decision. The decision gate 638 generates the phase decision $\widehat{\theta_k}$ of the sample k, $\widehat{\theta_k} = \arg(d_k) = \psi_{dk}$. In an embodiment, the PDE unit 643 may generate phase samples 637 e.g. as phase distortion estimates $\phi_k = \psi_k - \widehat{\theta_k} = \alpha_{rk} + \beta_k - \widehat{\beta_k} + \theta_k - \widehat{\theta_k}$; this may include estimating a "distortion field" with complex samples $u_k = r_k \exp[j(\psi_k - \widehat{\theta_k})] = r_k \exp(j\phi k)$.

The link monitor 650 may operate e.g., as described above with reference to FIGS. 2-5 and the optical signals 201 and 202. In some embodiments, the link monitor 650 may correlate a segment of any one of the streams of phase samples 637 with a corresponding sequence of power values $\{p_k\}$ for a co-propagating sequence of symbols of the second optical signal 602.

In embodiments where the first and second optical signals 601 and 602 are commonly polarization multiplexed at a same COT, the symbol power values $p_{kx}$ to correlate with the (noise) phase samples 637x of the X polarization tributary may be computed as $$p_{kx} = 2|b_{kx}|^2 + |b_{ky}|^2 \qquad (4A)$$

while the symbol power values $p_{ky}$ to correlate with the noise phase samples 637yx of the Y polarization tributary may be computed as $$p_{ky} = |b_{kx}|^2 + 2|b_{ky}|^2 \qquad (4B)$$

where $b_{kx}$ and $b_{ky}$ are the amplitudes of the k-th symbol interval for the X and Y tributaries of the second optical signal 602, respectively. In embodiments where the second optical signal 602 is polarization multiplexed at a different COT independently of the first optical signal 601, the DP 640 (e.g. the link monitor 650), may cross-correlate sequences of phase samples 637X and 637Y of the X and Y polarization tributaries of the first optical signal 601 with a same sequence of power values {pk} of the second optical signal 602, e.g. with $p_k=2|b_{kx}|^2+2|b_{ky}|^2$.

Embodiments described above exploit XPMs induced by nonlinear interactions between two frequency-multiplexed optical signals co-propagating in an optical fiber. An XPM induced upon a pulse (data symbol) of a CUT signal, e.g. 201 or 601, by its collision with a pulse (data symbol) of a second optical signal, e.g. 202 or 602, may be approximately described using an approximate analytical framework presented in, e.g., in R. Dar, M. Feder, A. Mecozzi, and M. Shtaif, "Pulse collision picture of inter-channel nonlinear interference noise in fiber-optic communications," J. Lightw. Technol, vol. 34, no. 2, pp. 593-607, 2016, which is incorporated herein by reference in its entirety.

In a first-order perturbative approximation, non-linear Kerr interactions add a non-linear interference (NLI) contribution to a signal detected by a coherent optical receiver, such as e.g. the COR 220 or 600. In embodiments without polarization multiplexing, the NLI contribution to the i-th sample detected by the COT for the CUT after recovering the linear impairments accumulated during propagation and sampling, e.g. as described above with reference to FIG. 6, can in some approximation be described by the following discrete-time model describing four-pulse collisions:

$$n_i = -j\frac{8}{9}2\gamma \sum\nolimits_{k,m,n} b_k^* b_m a_n X_{kmni} \qquad (5)$$

where the summation is from −∞ to ∞, and $X_{kmni}$ is defined by the following equation (6) and is hereafter referred to as the collision tensor:

$$X_{kmni}=\int_0^L f(z)\int_{-\infty}^{\infty} p^*(z,t-kT-\tau(z))p(z,t-mT-\tau(z))p^*(z,t-iT)p(z,t-nT)dtdz \qquad (6)$$

Here $n_i$ is the NLI impairing the CUT digital symbol $a_i$ at discrete-time symbol i, $b_k$ is the k-th digital symbol in the interfering channel, $\gamma$ is a coefficient characterizing the strength of the Kerr nonlinearity in the optical fiber, f(z) is a nominal loss profile of an optical path of the signals along a propagation coordinate z, p(z,t) is the supporting pulse shape of the digital modulated signals at coordinate z, accounting for pulse distortions due to the CD accumulated up to that coordinate and at time t, $\tau(z)$ is the channel walk-off, i.e., the delay between the interfering channel and the CUT arising from the different group velocities of the two signals in the optical fibers. The discrete-time indexes (k,m,n,i) label the four pulses under Kerr interaction, i.e., the four pulses undergoing collision during propagation.

Equation (5) may be generalized for embodiments with polarization multiplexing, e.g. as described above with reference to FIG. 6. Data symbols carried by a polarization multiplexed optical signal may be described by a two-element vector, the two elements of which being the corresponding data symbols transmitted over the X and Y polarizations:

$$\vec{a}_k=[a_{kx},a_{ky}], \vec{b}_k=[b_{kx},b_{ky}] \qquad (7)$$

where $a_{kx}$ and $a_{ky}$ are the corresponding k-th symbols transmitted in the CUT over the X- and Y-polarizations, respectively, and $b_{kx}$ and $b_{ky}$ are the corresponding k-th symbols transmitted in the interfering channel over the X- and Y-polarizations, respectively. With this notation, the NLI contribution to the i-th sample of the CUT signals detected by a COR, e.g. the COR 600, after recovering the linear impairments accumulated during propagation and sampling, e.g. signals 635X and 635Y of the COR 600 of FIG. 6, can be approximately described by the following equation (8):

$$\vec{n}_i = -j\frac{8}{9}\gamma \sum\nolimits_{k,m,n}\left(\vec{b}_k^H \vec{b}_m I + \vec{b}_k \vec{b}_m^H\right)\vec{a}_n X_{kmni} \qquad (8)$$

where the superscript "H" indicates transpose conjugate and I is the identity 2×2 matrix. Equation (8) suggests that in the absence of polarization-mode dispersion, which is typically small in modern SMF, the NLI due to collisions of polarization multiplexed pulses is still weighted by the same tensor $X_{kmni}$.

In some approximation, embodiments described above with reference to FIGS. 1-6 may be viewed as exploiting two-pulse collisions, corresponding to (k=m) and (n=i) in equations (5), (6), and (8). The NLI $n_i$ induced by two-pulse collisions contributes to the quadrature (Q) signal component and thus to the collision-induced XPM. The collision tensor $X_{kkii}$ for the two-pulse collisions satisfies the following equation (9):

$$X_{kknn}=\int_0^L f(z)\int_{-\infty}^{\infty}|p(z,t-kT-\tau(z))|^2|p(z,t-nT)|^2 dtdz \qquad (9)$$

describes relative strengths of the XPMs induced in the CUT at a plurality of locations along the link, with each element bearing the signature of a collision region of the two pulses.

In an example embodiment absent of polarization multiplexing, equation (6) for the NLI caused by two-pulse collisions may be rewritten for an XPM contribution $\varphi_i$ into the phase of the i-th symbol of the CUT:

$$\varphi_i = -\frac{8}{9}\gamma \sum\nolimits_k p_k X_{kkii} \qquad (10)$$

where $p_k=|b|_k^2$ is the symbol power of the k-th interfering pulse. In this embodiment, the XPM cross-correlation $c_n$ computed according to equation (1), i.e. by cross-correlating the sequence of phase distortion samples $\phi_i$ detected for the first optical signal with a corresponding sequence of the symbol powers $\{p_k\}$ of the second optical signal, is approximately proportional to a square of a product of the symbol power $p_k=|b|_k^2$ of the interfering pulse, and the collision tensor $X_{kkii}$, with i=k−n:

$$c_n=A \cdot X_{kkii}+B, \qquad (11)$$

where A and B are constant independent of n, and $X_n=X_{kkii}$, i=(k−n). In some embodiments $p_k=(|b_k|^2-<|b_k|^2>)$, and B=0. Accordingly, the estimation of the cross-correlation $c_n$, e.g. as described above, may also provide an estimate of the two-pulse collision tensor $X_{kkii}$. In an embodiment where the two optical signals are polarization multiplexed, an estimate of the two-pulse collision tensor $X_{kkii}$ may be obtained by computing the cross-correlation of the sequence of phase distortion samples $\phi_i$ obtained for the first optical signal in one of the two X- or Y-polarization channels with the symbol power sequences defined e.g. by equations (4A) and (4B), as described above.

Figure 7:
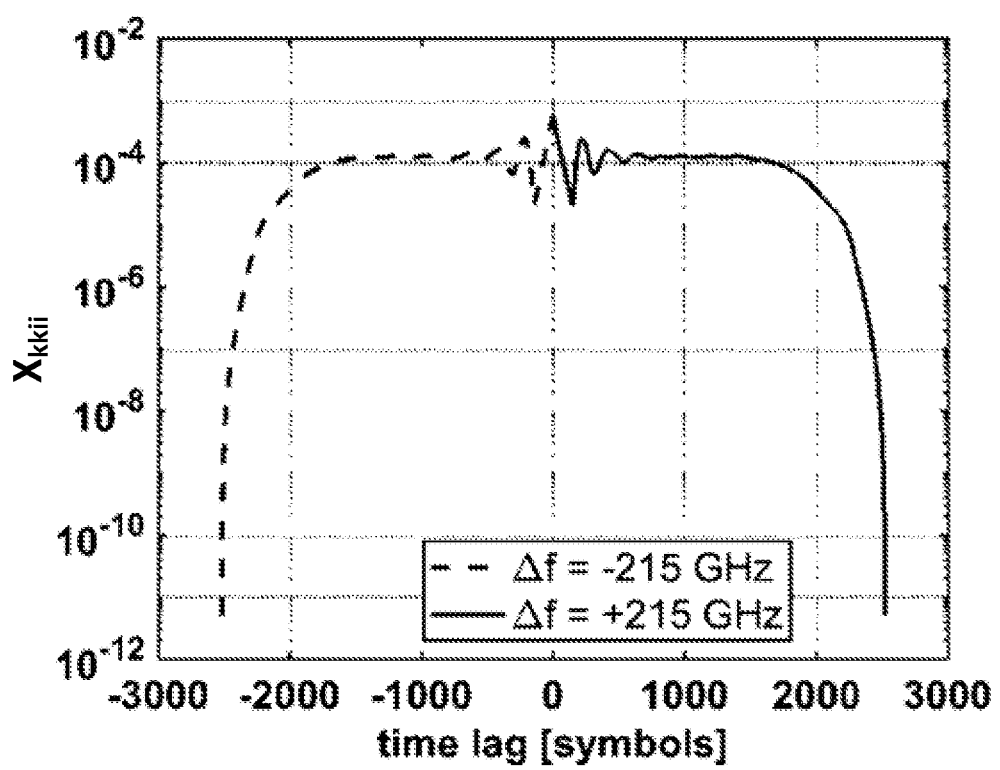
FIG. 7 is a plot illustrating a two-pulse collision tensor Xkkii as a function of the propagation time lag between the pulses, for two signs of the optical frequency shifts between the CUT and the probe channel, according to simulations.

As an illustration, FIG. 7 shows an example of the two-pulse collision tensor for a computer-simulated 10-span SMF link, with the interfering channel spaced 215 GHz (solid line) or (−215) GHz (dashed line) from the CUT, and a symbol rate of 64 Gbaud. As can be seen from FIG. 7, in this example each pulse of the CUT may experience on the order of 2000 NLI-inducing collisions with pulses of the interfering channel. The collisions occur at different locations along the optical fiber link, see e.g. FIGS. 4A and 4B, with the collision tensor $X_{kkii}$ carrying signatures of those locations.

Figure 8:
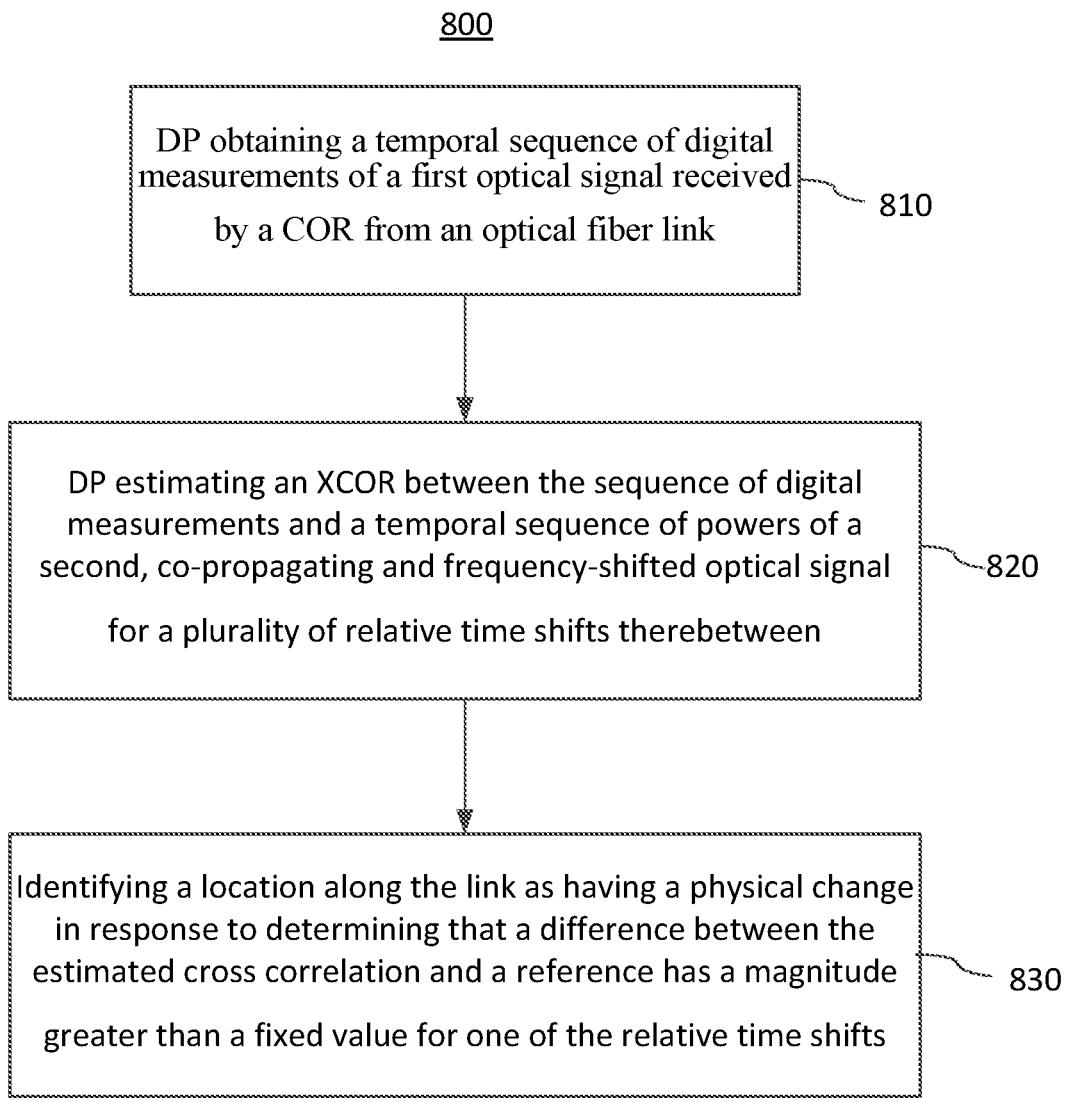
FIG. 8 is a flowchart of a method for monitoring changes along an optical fiber link using cross-correlation measurements on an output of a coherent optical receiver to detect XPMs by a co-propagating channel.

FIG. 8 shows a flowchart of a method 800 for monitoring changes in light propagation properties of an optical fiber link along a length thereof, according to an aspect of the present disclosure. In FIG. 8, each block represents one or more operations that may be performed by various elements or modules of the example systems and apparatuses described herein with reference to FIGS. 1, 2, and 6.

In an embodiment, the method starts with a step 810 wherein a DP (e.g. 240 or 640) obtains a temporal sequence of digital measurements (e.g. 227, or 637) of a first optical signal (e.g. 201 or 601) received by the COR from an optical fiber link (e.g. 130 or 230). At step 820, the DP estimates a cross-correlation (e.g. 251) between the sequence of digital measurements and a temporal sequence of power values of a second optical signal for a plurality of relative time shifts (e.g. 235) between the sequences, the second and first and second optical signals being in different frequency channels on the optical fiber link, each of the digital measurements representing a phase distortion $\phi_i$ of the received first optical signal at a corresponding time instance $t_i$, e.g. a sampling time. At step 830, the DP identifies a location along the optical fiber link as having a physical change in response to determining that a difference between the estimated cross correlation and a reference cross-correlation has a magnitude greater than a fixed value for one of the relative time shifts.

According to the method, the first optical signal co-propagated with a second optical signal along a length of the optical fiber link, the second optical signal being power-modulated and shifted in optical frequency from the first optical signal. In an embodiment, the first optical signal may be processed, e.g. at step 810, to output streams of phase distortion samples for the first optical signal. In some embodiments the processing at step 810 may be performed at least in part by a DSP of a COR, e.g. the DSP 630 of COR 600. In some embodiments the processing at step 810 may be performed in part off-line by a separate DP, e.g. the DP 240 or 640, which may be either co-located with the COR or remote from the COR. Furthermore, embodiments may be envisioned in which an approximate removal of the transmitter-related phase modulation component from the phase sampling measurements may be performed by the DSP of the COR without an explicit subtraction of phase decisions, e.g. for QPSK signals.

The processing at step 820 may include using a cross-correlation estimator, e.g. 253, to determine a pattern of XPMs of the first optical signal by the second optical signal, e.g. in the form of the cross-correlation $c_n$. In some embodiments, the cross-correlation may be analyzed as a function of the symbol lag index n, between the first and second signals along the length of the optical fiber link. In some embodiments, the processing at step 820 may further include computing a cPSD periodogram followed by an IFFT processing, e.g. as described above with reference to FIG. 5.

In some embodiments, step 830 may include subtracting $C_n$ from a reference $C_{nRef}$ (i.e., calculated for the line without anomalies) to compute an (anomaly) indicator vector $\Delta_n = [C_n - C_{nRef}]$. Some embodiments may include identifying time lags in for which the corresponding anomaly indicator $\Delta_n$ is outside of a pre-determined range $(-\Delta_{1n}, \Delta_{2n})$ of normal operation. In some embodiments, peaks (i.e., local maxima) of the anomaly indicator calculated in step 830 are identified, e.g., using a suitable peak detection algorithm and/or threshold crossing method. The time lags $\tau_n$ corresponding to these peaks are then mapped into the detected positions of the anomalies along the length of the optical fiber link based on the time lag index n thereof, e.g. as described above. In other embodiments, the anomaly indicator vector may be provided to an artificial intelligence algorithm which is trained to distinguish between anomalies of different types and/or detects anomaly amplitudes.

Figure 9:
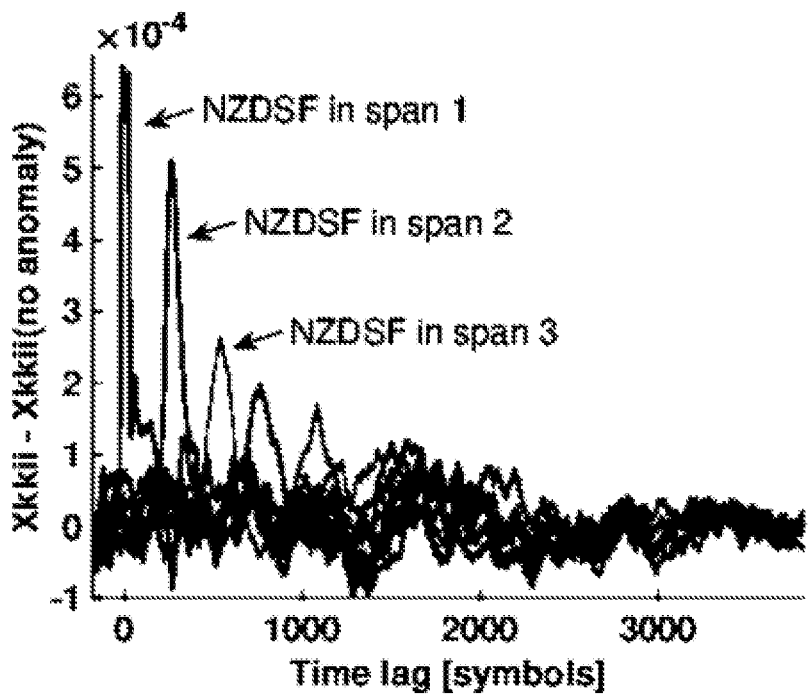
FIG. 9 is a plot illustrating changes, according to computer simulations, in the collision tensor Xkkii relative to a reference, for a computer-simulated model of a 10-span optical fiber link, in response to changing the CD in one of the spans.

Some features of the cross-correlation method described above may be qualitatively illustrated with reference to FIG. 9, which shows an application of the method to detect a CD anomaly for a numerical model of an optical fiber link. In the simulations, the optical fiber link had 10 spans of SMF optical fibers, each span being 100 km long; the optical fibers had an attenuation of 0.2 dB/km and a nonlinear coefficient of 1.3 1/W/km. The transmission of 15 WDM channels, spaced 75 GHz, modulated with 16QAM at 64 Gbaud each, was simulated using the split-step Fourier method. The vertical axis shows the difference between the tensor $X_{kkii}$, as estimated using the cross-correlation processing described above, and its value without the dispersion anomaly, according to the simulations. The horizontal axis shows the distance from the beginning of the link, expressed in terms of the propagation time lag, in symbol intervals, between the colliding pulses of the CUT and the probe channel; the further away from the beginning of the link, the proportionally larger is the propagation time lag. The dispersion anomaly is represented by having an NZDSF fiber with a different dispersion coefficient, i.e., 2 ps/nm/km, in a single fiber span of the 10-span SMF link. The CUT is the central, i.e., $8^{th}$, of the WDM channels simulated, the second (probe) channel is the 12th WDM channel, corresponding to $\Delta f_{12}$=225 GHz. The cross-correlation of the phase distortion signal, coherently detected and sampled at the end of optical fiber link using the data processing described above with reference to FIG. 6, and a power modulation pattern of the probe channel signal, was computed using averaging over 50 randomly seeded signal blocks of 65536 symbols each. The noise floor visible in FIG. 9 can be reduced by increasing the number of observation blocks. The different peaks in FIG. 9 correspond to different positions of the anomalous fiber in the link.

The spatial resolution of the method depends on the frequency spacing between the CUT and probe channels, and on the amount of the CD accumulated by the colliding pulses. For a set value of the frequency spacing Mu, the spatial resolution of the method is better at the beginning of the optical fiber link, i.e. at smaller distances from the source COT, because of the smaller CD-induced broadening of the pulses, and correspondingly smaller length of the collision region; this is illustrated e.g. by the narrower peaks in FIG. 9 near the beginning of the link.

Figure 10:
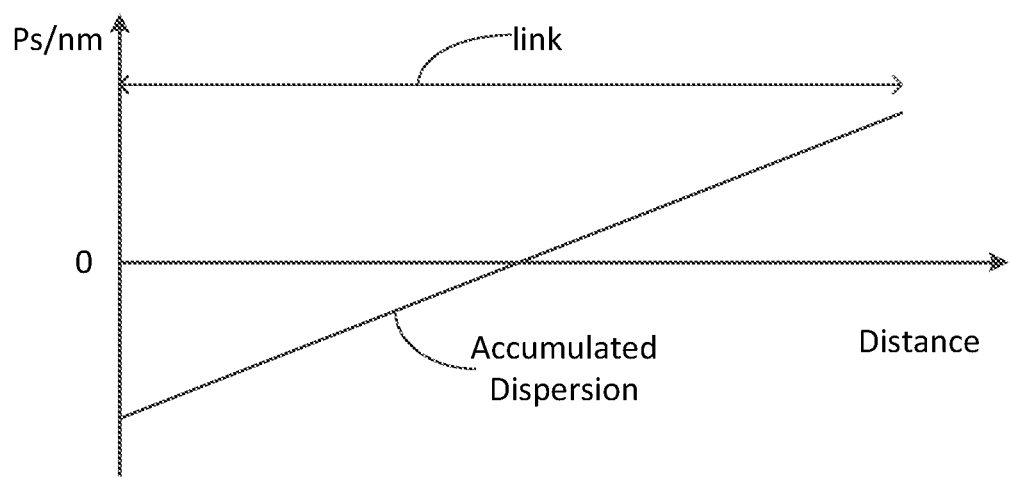
FIG. 10 is a schematic diagram illustrating a CD accumulated by a dispersion-precompensated optical signal propagating along an optical fiber link.

To increase the spatial resolution, some embodiments of the method 800 may exploit optical signals traveling both in the forward and in the backward direction along the same optical fiber link, such that the anomaly detection is performed at the two link-end of the CUT connection. In this way, the spatial resolution of the method may be suitably high at both ends of the link. In some embodiments of the method 800, one or both of the first and second optical signals may be dispersion pre-compensated before entering the optical fiber link, e.g. at the COT 110 or 210, e.g. by adding a suitable amount of frequency chirp to the signal. The dispersion pre-compensation may be done either in the electrical domain, e.g. by adding a linear frequency chirp to the modulation signal using an electrical-domain dispersion pre-compensator, or in optical domain, e.g. by using a suitable length of dispersion compensation fiber. In some embodiments, the amount of the dispersion pre-compensation may be selected so that the CD accumulated by the optical signal is zero at a given coordinate of the optical fiber link, as illustrated in FIG. 10.

The example embodiments described above are not intended to be limiting, and many variations will become apparent to a skilled reader having the benefit of the present disclosure. For example, the data rates in the CUT and probe channels may be different. Furthermore in the description above, for purposes of explanation and not limitation, specific details are set forth such as particular architectures, interfaces, techniques, etc. in order to provide a thorough understanding of the present invention. In some instances, detailed descriptions of well-known devices, circuits, and methods are omitted so as not to obscure the description of the present invention with unnecessary detail. Thus, for example, it will be appreciated by those skilled in the art that block diagrams herein can represent conceptual views of illustrative circuitry embodying the principles of the technology. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, while the present invention has been particularly shown and described with reference to example embodiments as illustrated in the drawing, it will be understood by one skilled in the art that various changes in detail may be affected therein without departing from the spirit and scope of the invention as defined by the claims.

We claim:

1. An apparatus comprising:
a digital processor (DP) being configured to obtain a temporal sequence of digital measurements of a first optical signal received by a coherent optical receiver (COR) from an optical fiber link and being configured to estimate a cross-correlation between the temporal sequence of digital measurements and a temporal sequence of powers of a power-modulated second optical signal for a plurality of relative time shifts between the sequences, the first and second optical signals having been transmitted to the optical fiber link in different frequency channels, each of the digital measurements representing a phase distortion of the received first optical signal at a corresponding time; and
wherein the DP is configured to identify a location along the optical fiber link as having a physical change in response to a magnitude of a difference between the estimated cross correlation and reference cross-correlation being greater than a fixed value for one of the relative time shifts; and
wherein the DP is configured to estimate the location of the physical change from the value of the one of the relative time shifts.

2. The apparatus of claim 1, wherein the DP is configured to estimate that the location is at a distance along the optical fiber line, the distance being about the value of the one of the relative time shifts times a magnitude of a difference between the propagation velocities of the first and second optical signals on the optical fiber line.

3. The apparatus of claim 1, wherein the DP is configured to subtract, from phase measurements of the first optical signal at sampling times, phase decisions corresponding to said phase measurements to obtain the digital measurements.

4. The apparatus of claim 1, wherein the physical change includes a change of at least one of a chromatic dispersion of a segment of the optical fiber link at the location and an optical attenuation of the segment of the optical fiber link at the location.

5. The apparatus of claim 1, further comprising the COR.

6. The apparatus of claim 5, wherein the COR is configured to determine the digital measurements from measures of the received first optical carrier, at least partially, digitally compensated for chromatic dispersion caused on the first optical signal in the optical fiber link.

7. The apparatus of claim 5, wherein the COR is configured to decode for each of the digital measurements a corresponding data symbol value carried by the first optical signal.

8. The apparatus of claim 5, further comprising at least one optical transmitter configured to transmit the first and second optical signals to the optical fiber link, the at least one optical transmitter being configured to transmit the second optical signal on an optical supervisor channel and to transmit the first optical signal in the optical telecommunication C-band.

9. The apparatus of claim 5, further comprising an optical transmitter configured to transmit the first and second optical signals to the optical fiber link, the optical transmitter being configured to transmit the first and second optical signals over different subcarriers of an optical super-channel.

10. The apparatus of claim 1, wherein the temporal sequence of digital measurements is for a first polarization component of the first optical signal, and the temporal sequence of power values comprises a first combination of power values of two different polarization components of the second optical signal; and
wherein the DP is further configured to estimate a cross-correlation between another temporal sequence of digital measurements of the first optical signal for a different second polarization component of the first optical signal, and another temporal sequence of power values comprising a second combination of power values of the two different polarization components of the power-modulated second optical signal.

11. The apparatus of claim 4, wherein the temporal sequence of digital measurements is for a first polarization component of the first optical signal, and the temporal sequence of power values comprises a first combination of power values of two different polarization components of the second optical signal; and
wherein the DP is further configured to estimate a cross-correlation between another temporal sequence of digital measurements of the first optical signal for a different second polarization component of the first optical signal, and another temporal sequence of power values comprising a second combination of power values of the two different polarization components of the power-modulated second optical signal.

12. A method for monitoring an optical fiber link, the method comprising:
at a digital processor (DP), receiving a temporal sequence of digital measurements of a first optical signal received by a coherent optical receiver (COR) from an optical fiber link;
estimating a cross-correlation between the sequence of digital measurements and a temporal sequence of powers of a second optical signal for a plurality of relative time shifts between the sequences, the second and first and second optical signals being in different frequency channels on the optical fiber link, each of the digital measurements representing a phase distortion of the received first optical signal; and identifying a location along the optical fiber link as having a physical change in response to determining that a difference between the estimated cross-correlation and a reference cross-correlation has a magnitude greater than a fixed value for one of the relative time shifts; and estimating the location of the physical change from the value of the one of the relative time shifts.

13. The method of claim 12, further comprising adding a frequency chirp to at least one of the first and second optical signals prior to transmitting thereof over the optical fiber link so as to lessen a chromatic dispersion induced pulse broadening thereof in a middle portion of the optical fiber link.

14. The method of claim 12, comprising subtracting, from phase measurements of the first optical signal at sampling times, phase decisions corresponding to said phase measurements to obtain the digital measurements.

15. The method of claim 13, further comprising:
receiving the first optical signal at the COR from the optical fiber link; and
transmitting the phase measurements of the first optical signal from the COR to the DP.

16. The method of claim 12, further comprising transmitting the first and second optical signals to the optical fiber link such the second optical signal is on an optical supervisor channel of the optical fiber link and the first optical signal is in the optical telecommunication C-band.

* * * * *